(12) United States Patent
Mackiewicz et al.

(10) Patent No.: US 6,606,859 B1
(45) Date of Patent: Aug. 19, 2003

(54) MASTER CYLINDER

(75) Inventors: John E. Mackiewicz, Niles, MI (US); Raymond Kosarski, Jr., Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 21 days.

(21) Appl. No.: 10/061,648

(22) Filed: Feb. 1, 2002

(51) Int. Cl.[7] .............................................. B60T 13/00
(52) U.S. Cl. ........................... 60/547.1; 60/548; 60/550
(58) Field of Search ................................ 60/547.1, 548, 60/550; 91/369.1, 376 R

(56) References Cited

U.S. PATENT DOCUMENTS

| | | | | |
|---|---|---|---|---|
| 4,441,319 A | * | 4/1984 | Brown | 60/548 |
| 4,490,977 A | * | 1/1985 | Fulmer | 60/547.1 |
| 4,514,981 A | * | 5/1985 | Brown et al. | 60/547.1 |
| 4,665,701 A | * | 5/1987 | Bach | 60/547.1 |
| 4,685,297 A | * | 8/1987 | Brown, Jr. | 60/547.1 |
| 4,724,674 A | * | 2/1988 | Fulmer | 60/548 |
| 4,754,604 A | * | 7/1988 | Flory | 60/547.1 |
| 5,036,665 A | * | 8/1991 | Brown, Jr. | 60/550 |

* cited by examiner

*Primary Examiner*—Edward K. Look
*Assistant Examiner*—Thomas E. Lazo
(74) *Attorney, Agent, or Firm*—Leo H McCormick, Jr.; Warren Comstock

(57) ABSTRACT

A master cylinder (12,212) including a housing (40,40a) with a bore (42,42a) for retaining a piston assembly (100, 200) to define a first chamber (54) that is connected to wheel brakes (14,14') in a first brake circuit and a second chamber (56) that is connected to wheel brakes (18,18') in a second brake circuit. The piston assembly (100,200) includes a sleeve (102,202) and a concentric cylindrical body (110,210) whose respective first and second end surface areas define a first effective area ($D_1$) while the second end surface area of the cylindrical body (110,210) defines a second effective area ($D_2$) within the bore (42,42a). A valve (60) activated by axial movement of an input member (30) allows operational hydraulic fluid to be simultaneously communicated to the wheel brakes (14,14') and the first chamber (54) where the operational hydraulic fluid acts on the first effective area ($D_1$) to move the piston assembly (100,200) and pressurize fluid in the second chamber (56) to develop pressurized fluid that is communicated to wheel brakes (18,18') to complete a first brake application. In an absence of operational hydraulic fluid in the first chamber (54), a manual input acts on the cylindrical (body 110,210) to move the second effective area (D2) into the second chamber (56) and pressurize fluid therein to initiate a second brake application.

10 Claims, 7 Drawing Sheets

FIG. 3

MASTER CYLINDER

This invention relates to a master cylinder wherein a piston assembly has first and smaller second surface areas that are combined to define a first effective area while the smaller second surface area defines a second effective area in a first chamber and where operational pressurized hydraulic fluid presented to the first chamber is directly communicated to wheel brakes in a first brake circuit and acts on the first effective area to pressurize fluid in a second chamber that is communicated to wheel brakes in a second brake circuit to effect a first brake application in response to movement of an input member by a force applied to a brake pedal and where movement of the input member by a manual force, in an absence of the presence of operational pressurized hydraulic fluid in the first chamber, moves the second effective area into the second chamber to pressurize fluid therein that is communicated to the wheel brakes in the second brake circuit.

BACKGROUND OF THE INVENTION

The present invention is of a type hydraulic brake boosters referred to as a "full-power" brake booster, of which the following U.S. Patents are considered to be typical: U.S. Pat. Nos. 4,441,319; 4,490,977; 4,514,981; 4,665,701; 4,685,297; 4,704,867; 4,724,674; 5,526,731 and 5,927,074. In such brake boosters, an accumulator is charged with fluid pressure and selective activated through movement of a control valve by an input member to present pressurized fluid to an actuation chamber that acts on an actuation piston. The actuation piston in turn provides a force for moving piston in a master cylinder that pressurizes operational fluid that is presented to wheel brakes to effect a brake application. The operational pressure that is developed is proportional to the force applied to the actuation piston and inversely proportional to the cross-sectional area of the piston in the master cylinder for a given force applied to an input member by an operator to move the control valve. The resulting travel of the input member and brake pedal is proportional to the travel of the actuation piston in the master cylinder. Conversely, the travel of the piston in the master cylinder is also proportional to the displacement of the fluid in the brake system at any given pressure and inversely proportional to the cross-sectional area of the actuation piston.

Thus, the travel of the input member and brake pedal is inversely proportional to the cross-sectional area of the actuation piston. Given these facts, in order to achieve less travel of the input member it is necessary to have a larger cross-sectional area for the pistons in the master cylinder. However with an increase in the size of the pistons in the master cylinder to produce a larger or increased output force, a same increase is necessary for an input force for effecting a brake application. An increase in the size of the pistons would not significantly effect the development of a brake application when pressurized fluid stored in an accumulator is available to provide a boost force, however, during a manual mode when the force is provided by an operator, under some circumstances an operator may not be capable of or have sufficient strength to develop an input force to produce an output force to meet braking requirement set by FMVSS-105 and FMVSS-135.

SUMMARY OF THE INVENTION

The present invention overcomes a disadvantage in the prior brake systems when switching from a power assist mode to a manual mode to effect a brake application by providing a master cylinder with a piston assembly having a first cross-sectional area that is utilized during a power assist mode of operation to effect a first brake application and a smaller second cross-sectional area that is utilized during a manual mode of operation to effect a second brake application.

According to this invention, the master cylinder in a first embodiment has a housing with a bore therein for retaining a first piston assembly to define a first chamber and a second chamber. The first chamber is connected through a first outlet port to wheel brakes in a first brake circuit while the second chamber is connected through a second outlet port to wheel brakes in a second brake circuit. The first piston assembly includes a first sleeve that has a concentric first cylindrical body located therein. The first sleeve has a first surface area and the first cylindrical body has a second surface area that are combined to define a first effective area within the first chamber such that the diameter of the first sleeve is substantially equal to the diameter of the bore. The second surface area of the first cylindrical body has a diameter that is smaller than the sleeve and defines a second effective area within the first chamber. In the master cylinder in a second embodiment, a second piston assembly that engages the first piston assembly and includes a second sleeve with a concentric second cylindrical body located therein. The second sleeve has a diameter equal to the first sleeve and as a result the surface area of the second sleeve and second cylindrical body which is located in the second chamber is equal to the first effective area. The surface area of the second cylindrical body that is located in the second chamber may or may not be equal to the surface area of the first cylindrical body located in the first chamber but in a preferred use such are substantially equal. In both the first and second piston assembles, the first cylindrical body has a blind bore therein that carries a valve to control communication of pressurized fluid from a source of operational hydraulic fluid to the first chamber. During a first or power assist mode of operation, the valve is activated by movement of an input member connected to a brake pedal to correspondingly allow operational hydraulic fluid to be directly communicated to the wheel brakes in the first brake circuit by way of the first chamber to initiate a first brake application. The operational hydraulic fluid presented to the first chamber also simultaneously acts on first effective area of each piston assembly and moves such piston assembly toward the second chamber. After closing a compensation port to the second chamber, the first effective area of the piston assembly in the second chamber pressurize fluid therein and develops a first pressurized fluid that is communicated to wheel brakes in the second circuit to assist in effecting the first brake application. In a second or manual mode of operation the master cylinders in the first and second, embodiments function to effect a brake application when operational hydraulic fluid is not available for presentation to the first chamber. In a manual mode, an input force applied to the brake pedal by an operator is transmitted by the input member into the first cylindrical body and directly moves the second effective area into the second chamber to pressurize fluid therein and after closing of the compensation post develop pressurized fluid that is communicated to the wheel brakes in the second brake circuit to effect a second brake application. The ratio of the first effective area to the second effective area is selected such the pedal travel necessary to achieve a pressure level of the fluid in the second chamber in the manual mode is about twice the travel as required during a power assist mode. In the second embodiment of the piston assembly, a space is located in the abutment of the first sleeve and concentric first cylindrical body and the second sleeve and second cylindrical body to define a secondary actuation chamber. The secondary actuation chamber is connected to the source of operational hydraulic fluid through an electronic control valve under the control of an electronic control unit (ECU) for the vehicle. The ECU receives various inputs relating to conditions that may effect a safe operation of the vehicle. The inputs are analyzed by the ECU and if conditions dictate a signal to effect a brake application is developed to attenuate or at least reduce the effect of the conditions on the operation of the vehicle. The electronic control valve on being activated by the ECU allows pressurized operational hydraulic to be communicated to the secondary actuation chamber. The fluid pressure of the operational hydraulic fluid simultaneously act on the first effective area first effective area defined by the second sleeve and second cylindrical body and the first cylindrical body to move the second sleeve and second cylindrical body toward the second chamber and the first cylindrical body toward the first chamber. Movement of the first sleeve and its first cylindrical body toward the first chamber opens the first valve carried by the first cylindrical body to allow operational hydraulic fluid to be communicated from the inlet port directly to the wheel brakes in the first circuit to effect a brake application per the ECU. Similarly, movement of the second sleeve and second cylindrical body toward the second chamber pressurizes fluid in the second chamber to develop pressurized fluid that is supplied to the wheel brakes in the second circuit to effect a brake application per the ECU. Once the situation has abated or been reduced as indicated by the signals supplied to the ECU, the ECU terminates the activation of the electronic control valve and the actuation chamber is communicated to the reservoir such that the return spring brings second sleeve and second cylindrical body into engagement with the first sleeve and first cylindrical body to reestablish a position of rest for the piston arrangement.

An advantage of this invention resides in a master cylinder having a single piston assembly wherein a plurality of wheel brakes in a first brake circuit are directly supplied with operational hydraulic fluid and wheel brakes in a second brake circuits are supplied with pressurized fluid developed by the operational hydraulic fluid to effect a brake application.

An object of this invention is to provide a master cylinder having a piston assembly through which first and second brake circuits are provided with pressurized fluid in response to either an operator input or an electronic input to effect a brake application wherein a substantially identical pressurized fluid level is developed to effect a brake application in at least the first brake circuit is substantially identical.

A further object of the invention is to provide a master cylinder with a piston assembly whereby the distance of the travel of the input member during a hydraulic boost mode to develop a first pressurized fluid is about one half of the distance of the travel of the input member during a manual mode to develop a second pressurized fluid having a substantially same pressure level.

BRIEF DESCRIPTION OF THE DRAWINGS

Figure 3:
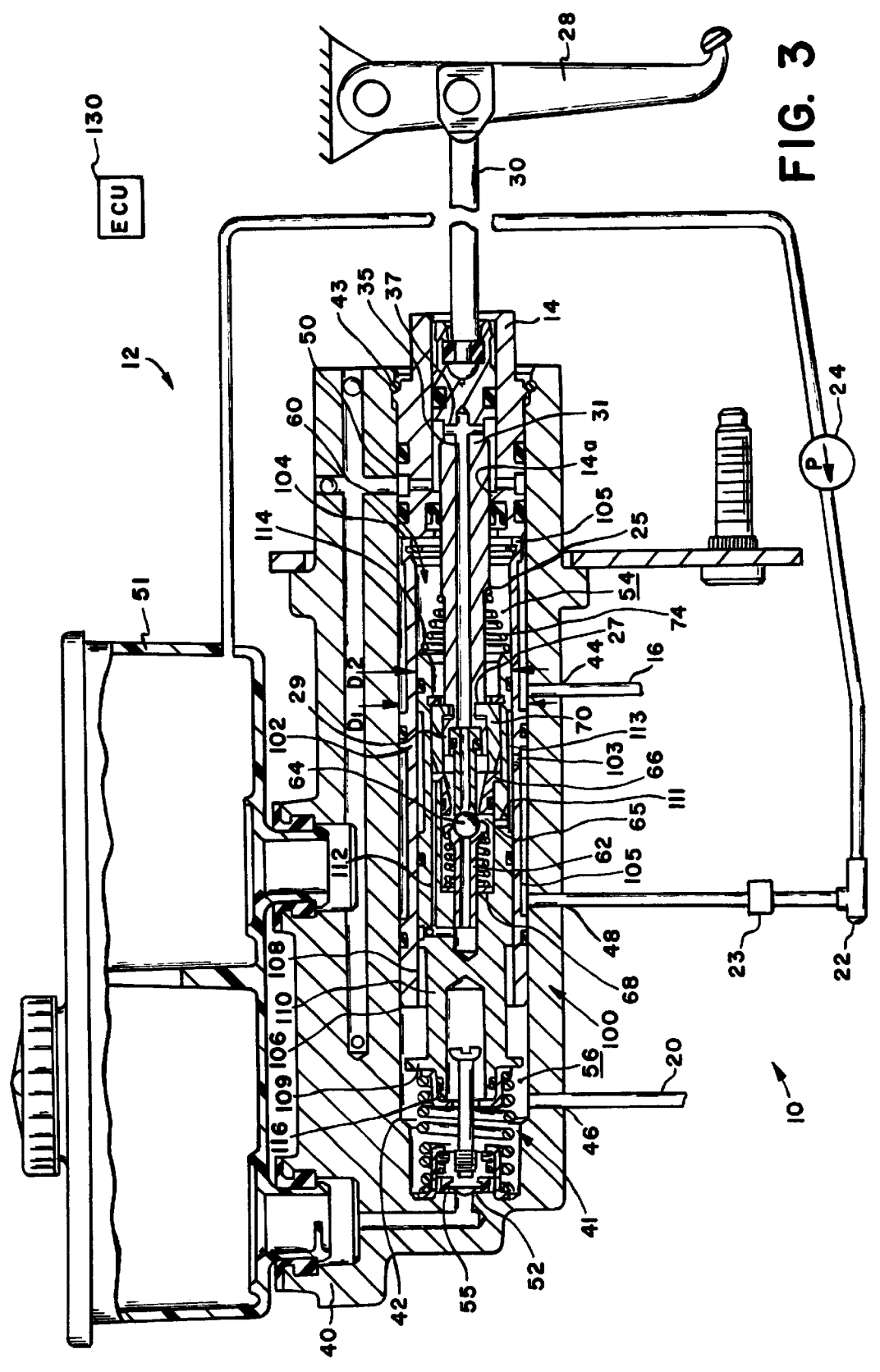

FIG. 3 is a sectional view of the master cylinder of FIG. 1 in a manual mode of operation;

DETAILED DESCRIPTION

Figure 1:
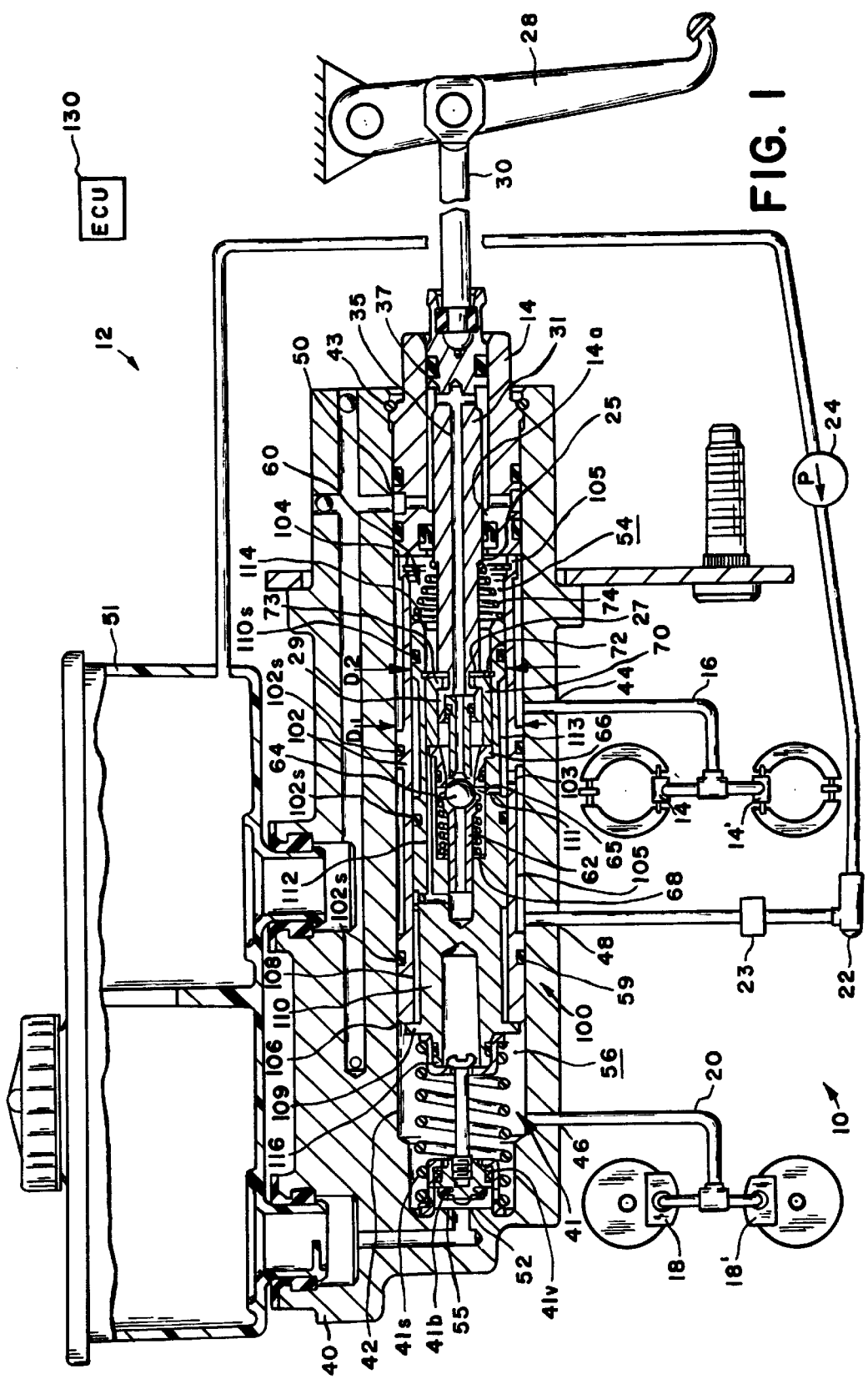
FIG. 1 is schematic illustration of a brake system with a master cylinder made according to the principals of the present invention.
Figure 2:
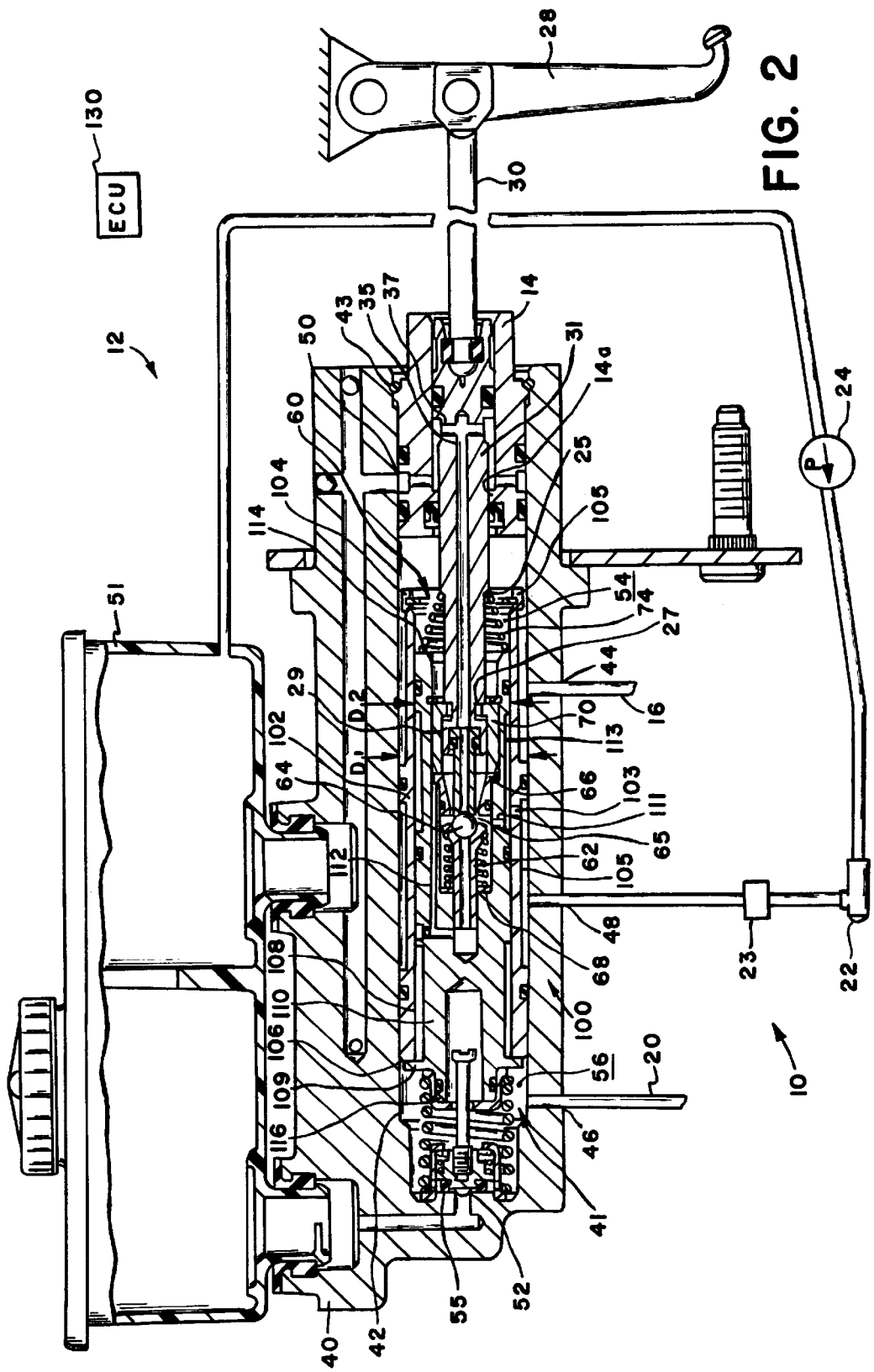
FIG. 2 is a sectional view of the master cylinder of FIG. 1 in a power assist mode of operation.

The brake system 10 shown in FIG. 1 includes a master cylinder arrangement 12 that is commonly referred to as a "full-power" brake booster. This type of master cylinder arrangement 12 is operated through a manual force that is applied by axial movement of an input rod 30 assembly responding to arcuate movement of a brake pedal 28. The input rod assembly 30 is connected to a valve 60 that controls the communication of pressurized operational fluid to a piston for developing an operational force that correspondingly acts on pistons in the master cylinder to pressurize fluid that is communicated to wheel brakes to effect a brake application. With exception of the piston assembly 100, the master cylinder arrangement 12 in FIG. 1 is similar to the full-power brake booster disclosed in U.S. Pat. No. 4,724,674 wherein pressurized hydraulic fluid available in an accumulator 22 acts on a power piston to provides provide a force for pressurizing fluid that is supplied to a first set of wheel brakes 14,14' in a first circuit by a first conduit 16 and to a second set of wheel brakes 18,18' in a second circuit by a second conduit 20 to effect a brake application. The piston assembly 100, of the present invention, is located in bore 42 of housing 40 of the master cylinder 12, to define a first chamber 54 and a second chamber 56. The housing 40 is characterized by the bore 42 which has a first outlet port 44 through which the first chamber 54 is connected by conduit 16 to the wheel brakes 14,14' in the first brake circuit, a second outlet port 46 through which the second chamber 56 is connected by conduit 20 to the wheel brakes 18,18' in the second brake circuit, a inlet port 48 that is connected to accumulator 22 which is charged to a predetermined fluid pressure by a motor pump 24 in response to an actuation signal from ECU 130 to define a source of operational hydraulic fluid, a first compensation port 50 that is connected to a reservoir 51, and a second compensation port 52 that is connected to the reservoir 51.

In more particular detail, the piston assembly 100 is characterized by a first piston defined by sleeve 102 that is located in bore 42 and a second piston defined by a cylindrical body 110 that is located in an axial bore 108 in sleeve 102. Sleeve 102 has a first end 104 that is located in the first chamber 54 and a second end 106 that is located in the second chamber 56. The sleeve 102 carries various seals 102s that engage bore 42 while the axial bore 108 extends from the first end 104 to the second end 106. The cylindrical body 110 carries various seals 110s that engage the surface of sleeve 102 that defines the axial bore 108 and has a blind bore 112 that extends from a first end 114 toward a second end 116 for receiving the valve 60. The blind bore 112 is connected to inlet port 44 of housing 40 by way of passage 111 that extends to land 113 on the cylindrical body 110 and a passage 103 that extends to land 105 on sleeve 102. In this embodiment of the invention, the piston assembly 100 has a first effective area that is defined by a first diameter "$D_1$" that is substantially equal to the diameter of bore 42 and a second effective area that is defined by diameter "$D_2$" of the cylindrical body 110. The first effective area is created by combining the surface area on the face of sleeve 102 and surface area on the face of cylindrical body 110 to form a solid face or surface on which operational hydraulic fluid having a predetermined fluid pressure presented to the first chamber 54 acts to develop a boost force that acts on the piston assembly 100 to pressurizing fluid during a brake application. The first effective area was selected with the combined surface area of the sleeve 102 and cylindrical body 110 being about twice the surface area of cylindrical body 110 and as a result during the operation of the master cylinder 12 in a manual mode to effect a brake application, the input force moves the first cylindrical body 110 into the second chamber 56 a distance that is about double the distance the cylindrical body 110 moves when the combined surface area of the first sleeve 102 and first cylindrical body 110 are moved by a hydraulic force in the development of a similar level of pressurized fluid to effect a brake application.

The piston assembly 100 is positioned in bore 42 by a caged spring and center port arrangement 41 of a type disclosed in U.S. Pat. 5,943,863. The caged spring and center port arrangement 41 acts on the second end 106, through flange 109 on the cylindrical body 110, to urge end 104 on sleeve 102 toward end cap 14 and against end cap in a rest position. The end cap 14 is held in housing 40 by a snap ring 43 and seals bore 42 from the surrounding environment has an inner lip 14a that provides a bearing surface to assist in aligning stem 31 of the input rod 30 with valve 60.

The blind bore 112 in cylindrical body 110 has a plurality of steps or diameters such that a first diameter receives a first end of a stem 59 on plunger 62 of the valve 60. The second end of stem 59 receives a ball 64 that is urged toward a seat member 66 by a spring 68 located in the blind bore 112. Seat member 66 is located in the blind bore 112 by a guide 70 retained by a snap ring assembly 72. Guide 70 in conjunction with lip 14a on end cap 14 axially hold stem 31 of the input rod assembly 30 in alignment orifice 65 in seat member 66 and ball 64 on stem 59. A return spring 74 is located between snap ring assembly 72 and shoulder 25 on stem 31 to position stem 31 in a rest position such that the end 33 of stem 31 is in communicated to the first compensation port 50 by way of the first chamber 54, a flow path between guide 70 and the peripheral surface of stem 31, passage 35 and cross bore 37 in stem 31 and passage 15 in end cap 14.

Mode of Operation

When an operator desires to effect a brake application, an input force applied to brake pedal 28 is translated into a linear force that initially moves push rod assembly 30 and brings end 33 on stem 31 into engagement with ball 64 on valve 60 to close communication from chamber 54 to compensation port 50 by way of passage 35. Further movement of stem 31 moves bail 64 away from a face surrounding orifice 65 on seat member 66 to allow operational hydraulic fluid available in the accumulator 22 to be communicated to the first chamber 54 by way of inlet port 44, land 105, passage 103, land 113, passage 111, orifice 65, a space or slot located between the interior surface of guide 70 and flange 29 on the end of stem 31, that portion of the blind bore 112 in cylindrical body 110 between snap ring 72 and end 116, that portion of axial bore 108 in sleeve 102 between the end 116 of cylindrical body 110 and end 104, slot 105 on end 104 and bore 42. The fluid pressure of the operational hydraulic fluid in chamber 54 that is directly communicated to the wheel brakes 14,14' in the first brake circuit to initiate the brake application and also acts on the first effective area $D_1$ of the piston assembly 60 located in chamber 54 to create a force that moves the piston assembly 100 toward the second chamber 56. Initial movement of the piston assembly 100 compresses return spring 41s in the caged spring and center port arrangement 41, to allow valve spring 41v to move seal 41b into engagement with seat 55 and close compensation port 52 to reservoir 51. Still further movement of the piston assembly 100 toward the second chamber 56 pressurizes fluid in chamber 56 that is communicated to the wheel brakes 18,18 in the second circuit to assist in effecting the brake application. An operator may terminate the brake application by ceasing the application of the input force on the pedal 28. Termination of the input force allows return spring 74 to move stem 31 toward the end cap 14 and allows return spring 68 to move ball 64 into engagement with face surrounding orifice 65 on seat member 66 to terminate communication of the operational hydraulic fluid from Inlet port 44 to chamber 54. Stem 31 moves toward end cap 14 until flange 29 is brought into engagement with stop 73 on guide 70 and end 33 is moved away from ball 64 to open passage 35 and allow the fluid pressure in chamber 54 to be communicated to reservoir 51 by way of compensation port 50. At the same time, return spring 41s in the caged spring and center port arrangement 41 acts on the second end 106 of sleeve 102 by way of flange 109 of the cylindrical body 110 to urge sleeve 102 toward end cap 14. As the return spring 41s moves the sleeve 102 toward the end cap 14, valve spring 41v is compressed and seal 41b is correspondingly moved from seat 55 surrounding compensation port 52 to allow the fluid pressure in chamber 56 to dissipate to reservoir 51.

The master cylinder 12 described above with respect to FIG. 1 utilizes the operational hydraulic fluid in accumulator 22 for providing a boost force in the pressurizing of fluid supplied to effect a brake application as a function of the fluid pressure of the fluid in the accumulator 22. In this brake system 10 should a failure occur in the operation of the motor pump 24 such as a loss of electrical power to operate or control the motor pump 24, a manual input force can be applied to brake pedal 28 to pressurize fluid in the master cylinder 12 to a level having a sufficient fluid pressure to effective a brake application to control the motion of the vehicle and bring the vehicle to a stop.

A manual mode of effecting a brake application from brake system 10 is achieved in the following manner. An input force applied to brake pedal 28 is translated into liner movement of input rod 30 that causes stem 31 to slide in lip 14a of end cap 14 and bring shoulder 27 into engagement with flange 73 on guide 70 to directly transmit a force into cylindrical body 110. This input force, after overcoming return spring 41s, moves the cylindrical body 110 with its second effective area, corresponding to $D_2$, into chamber 56 to allow spring 41v to move seal 41b to engage seat 55 and close compensation port 52. Thereafter any further movement of the first cylindrical body 100 into chamber 56 pressurizes fluid that is supplied to the wheel brakes 18,18' in the second circuit to effect a brake application. When the input force is applied to The cylindrical body 110 causes the cylindrical body 110 to slide in axial bore 108 has no effect on sleeve 102 that remains in a substantially stationary position within bore 42. Thus, the development of the pressurized fluid in the second chamber 56 during a manual mode is solely achieved through axial movement of the cylindrical body 110 in chamber 56. In the development of pressurized fluid through a manual mode, the cylindrical body 100 must move into chamber 56 a distance that is about twice the distance it moves into chamber 56 through the movement of the first effect area $D_1$ by the operational hydraulic fluid to develop a substantially same level of fluid pressurization to effect a brake application that is sufficient to meet current stopping requirements.

Figure 4:
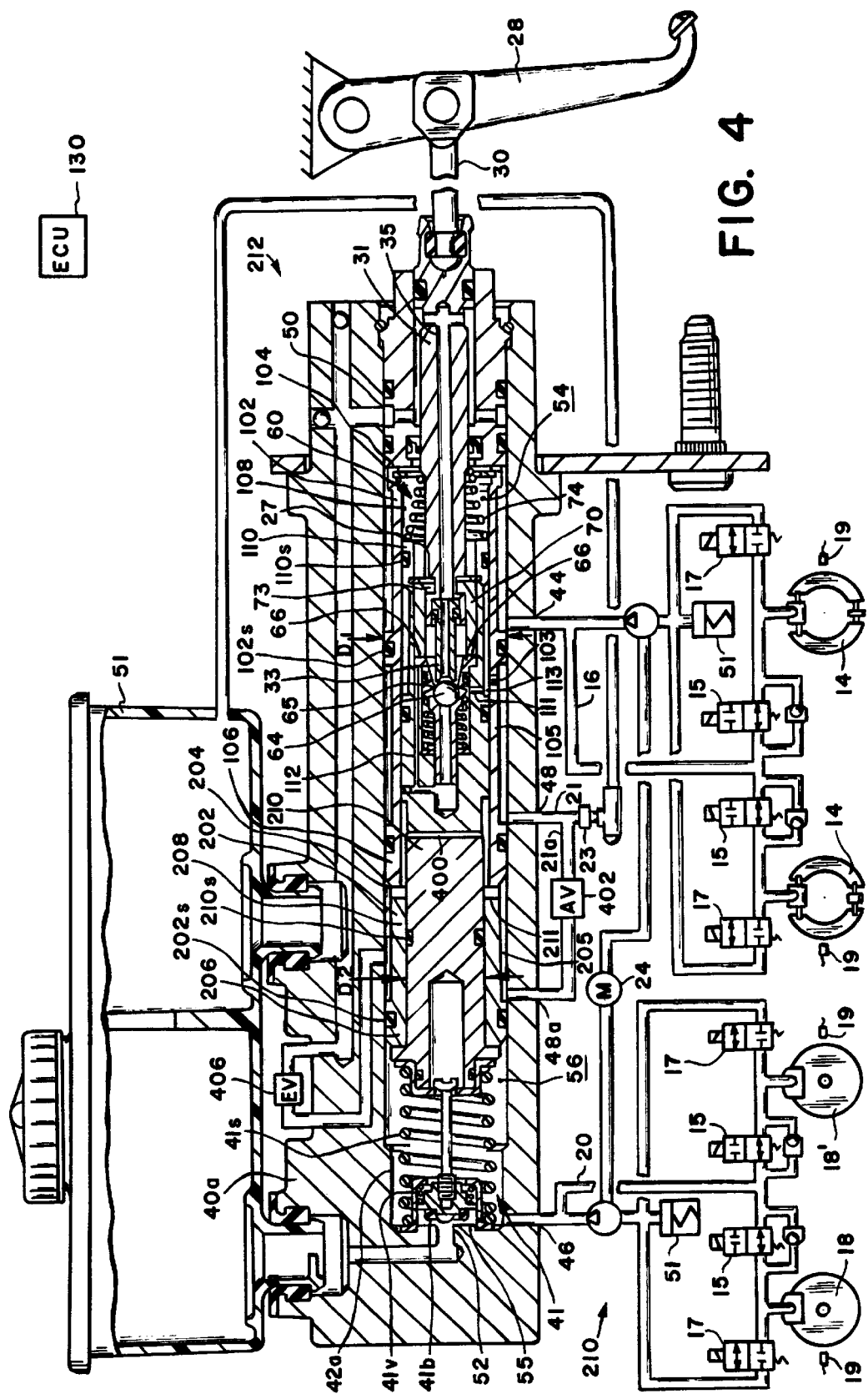
FIG. 4 is a sectional view of a second embodiment of the master cylinder of the present invention.

The master cylinder 12 as illustrated in FIG. 1 functions in an adequate manner in brake system 10, however, when additional features are desired enhance the safe operation of a vehicle such as anti-lock, traction control and sway control some modifications of brake system are required as illustrated by brake system 210 in FIG. 4.

In the brake system 210 illustrated in FIG. 4, where similar structural components have been described with respect to the brake system 10 in FIG. 1, the component is identified by the same number.

A principal distinction between the brake system 210 of FIG. 4 and brake system 10 of FIG. 1 is the addition of a wheel lock assembly, solenoid valves and various sensors that are under the control of the ECU 130. The wheel lock assembly is designed to limit the rotation of a wheel when rolling on a surface and decelerating from a first speed to a second speed wherein locking that may occur between a wheel and a surface during a brake application and wherein spinning of a wheel may occur with respect to a surface when a differential acceleration between wheels exceeds a predetermined difference.

In general, the wheel lock assembly illustrated in FIG. 4 is known and includes electric motor pump 24 and a build solenoid valve 15, a decay solenoid valve 17 and a wheel speed sensor 19 for each wheel in the first set of wheel brakes 14,14' in the first brake circuit and in the second set of wheel brakes 18,18' in the second brake circuit. During the operation of the vehicle, the ECU 130 receives information from the wheel speed sensors 19 and many other sensors in the vehicle such as: differential wheel speed of the wheel during acceleration, sway of the vehicle with respect to a horizontal plane; the operation of the motor pump 24; the pressure of the pressurized supply fluid, dynamic forces experienced by the vehicle; fluid supply pressure in accumulator 22, the level of fluid in a reservoir 51 and etc., all inputs which relate to the operation of the vehicle and may effect a brake application. The ECU 130 evaluates and analyzes the information or data relating to a current functional operational of the vehicle which may effect a safe operation thereof and if certain conditions exceed set limits, the ECU 130 independently operates master cylinder 212 to allow operational hydraulic fluid available in accumulator 22 to be utilized to effect a brake application and reduce or at least attenuate the sensed conditions to a safe level of operation of the vehicle.

The master cylinder 212 of FIG. 4 while similar to master cylinder 12 of FIG. 1 has an expanded piston assembly 200 that is located in bore 42a of housing 40a. The housing 40a is characterized by the bore 42a that has a first outlet port 44 through which the first chamber 54 is directly connected by conduit 16 to the wheel brakes 14,14' in the first brake circuit, a second outlet port 46 through which the second chamber 56 is connected by conduit 20 to the wheel brakes 18,18' in the second brake circuit, a first inlet port 48 that is connected by conduit 21 to accumulator 22 that is charged to a predetermined fluid pressure by a motor pump 24 in response to an actuation signal from ECU 130 to define a source of operational hydraulic fluid, a second inlet port 48a that is connected through solenoid valve 402 under the control of ECU 130 to conduit 21, a first compensation port 50 connected to a reservoir 51, and a second compensation port 52 connected to the reservoir 51.

Figure 5:
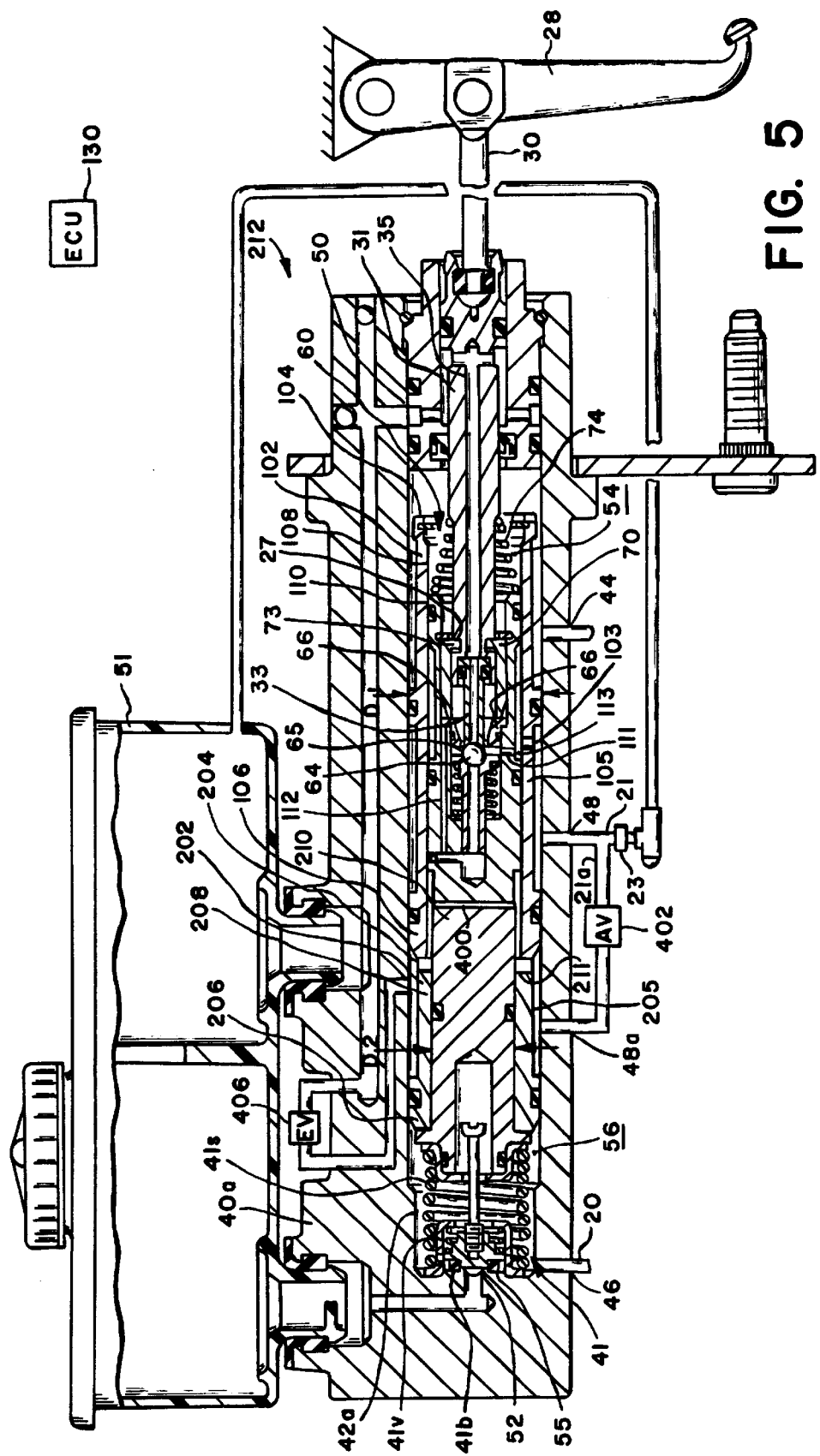
FIG. 5 is a sectional view of the master cylinder of FIG. 4 in a power assist mode of operation.

The piston assembly 200 is characterized by a first piston defined by a first sleeve 102 and a second sleeve 202 that are located in bore 42a and a second piston defined by a first cylindrical body 110 and a second cylindrical body 210 that are respectively located in axial bores 108 and 208 of sleeves 102 and 202. Sleeve 102 has a first end 104 that is located in the first chamber 54 and a second end 106 that abuts a first end 204 of sleeve 202 to locate a second end 206 of sleeve 202 in the second chamber 56. Sleeves 102 and 202 respectively carry various seals 102s, 202s that engage bore 42. The axial bore 108 in sleeve 102 extends from the first end 104 to the second end 106 and the axial bore 208 in sleeve 208 extends from the first end 204 to the second end 206. As shown in FIG. 4, axial bore 108 has a different diameter than axial bore 208 but may be equal depending on a desired ratio of input force to output force. Even though the second end 106 of the first sleeve engages the first end 204 of the second sleeve 202 and the first cylindrical body 110 engages the second cylindrical body 210 an actuation chamber 400 is created within bore 42. Actuation chamber 400 is connected to the second port 48a by slot 211 and land 205 on the second sleeve 202 and to reservoir 51 by a passage 404 in housing 40a. Communication from actuation chamber 400 to reservoir 51 is through a normally opened second solenoid valve 406 that is under the control of the ECU 130. The first cylindrical body 110 carries various seals 110s that engage the inner surface of sleeve 102 to seal the actuation chamber 400 from the first chamber 54 while the second cylindrical body 210 carries various seals 210s that engage the inner surface of sleeve 202 to seal the actuation chamber 400 from the second chamber 56. As with the piston assembly 10 of FIG. 1, the first cylindrical body 110 has a blind bore 112 that extends from a first end 104 toward a second end 106 for receiving the valve 60. The blind bore 112 is connected to inlet port 44 of housing 40a by way of passage 111 to land 113 on the cylindrical body 110 and a passage 103 to land 105 on sleeve 102. In this embodiment, the piston assembly 200 has a first effective area "$D_1$" defined by the combined surface area of the face of the first sleeve 102 and first cylindrical body 110 that is located in the first chamber 54. The first effective area "$D_1$" is substantially equal an area defined by the diameter of bore 42a. The piston assembly 200 has a second effective area "$D_2$" that is defined by the surface area of the face of second cylindrical body 210 located chamber 56 is defined as the diameter of the second cylindrical body 210. The operational hydraulic fluid available in accumulator 22 has a predetermined fluid pressure and when presented to the first chamber 54 acts on the first effective area "$D_1$" to develop a boost force that moves piston assembly 200 toward chamber 56 as illustrated in FIG. 5 to pressurize fluid in chamber 56 and effect a brake application. The first effective area "$D_1$" of master cylinder 200 was selected such that combined surface areas of the faces of sleeve 102 and cylindrical body 110 in chamber 54 are about twice the surface area of the face of cylindrical body 210 in chamber 56. With this relationship, during the manual mode of operation of the master cylinder 12 to effect a brake application, the distance that the input rod 30 moves cylindrical body 210 into chamber 56 is about double the distance that sleeve 202 and cylindrical body 210 moves when hydraulic force acting on the combined surface area defined by $D_1$ moves piston assembly 200 toward the second chamber 56 to effect a brake application with pressurized fluid having a similar pressure level.

The brake system 210 operates in substantially the same manner as brake system 10 in that ECU 130 controls the operation of the motor pump 24 to pressurize fluid that is supplied to the accumulator 22. The ECU 130 controls the operation of the various solenoids including the build 15 and decay 17 solenoid valves associated with each wheel and the actuation solenoid valves 402 and 404 in the brake system 210. During a normal operation of the vehicle, actuation chamber 400 is isolated from the operational hydraulic fluid in accumulator 22 as solenoid valve 402 in an off state is closed to prevent flow through conduit 21a to conduit 21. At the same time, actuation chamber 400 is in free communication with reservoir 51 as solenoid valve 406 in an off state is opened.

During the operation of the vehicle with the engine of the vehicle is running, accumulator 22 is charged to a predetermine fluid pressure by motor pump 24 under the control of the ECU 130 and the master cylinder 212 is designed to receive a hydraulic boost mode in the development of pressurized fluid to effect a brake application. Under these conditions, as with master cylinder 12, an input force applied to brake pedal 28 is translated into a linear force that moves push rod assembly 30 to bring end 33 of stem 31 into engagement with ball 64 to close communication from chamber 54 to compensation port 50 by way of passage 35. Further movement of stem 31 by the input force moves ball 64 away from a face surrounding orifice 65 on seat member 66 to allow operational hydraulic fluid available in the accumulator 22 to be communicated to the first chamber 54 by way of inlet port 44. Operational hydraulic fluid in chamber 54 is directly communicated to the wheel brake 14,14' in the first brake circuit and acts on $D_1$ of the piston assembly 200 to create an operational force that is transmitted from the first sleeve 102 into the second sleeve 202 and from the first cylindrical body 110 into the second cylindrical body 210. After overcoming the force of return spring 41s, the operational force moves the piston assembly 200 toward the second chamber 56 where spring 41v moves seal 41b against seat 55 to seal compensation port 52 and begin the pressurizing of fluid in chamber 56 that is communicated to the wheel brakes 18,18' in the second circuit to assist in the brake application. The functional position of the piston assembly wherein operational hydraulic fluid that is directly communicated to the wheel brakes 14,14' in the first circuit and pressurized fluid is communicated to the wheel brakes 18,18' in the second circuit as described above is illustrated in FIG. 5. Once a desired brake application has been achieved and the input force removed from pedal 28 and return spring 41s in bore 42a acts on the piston assembly 200 to return the components to a rest position as illustrated in FIG. 4.

Figure 6:
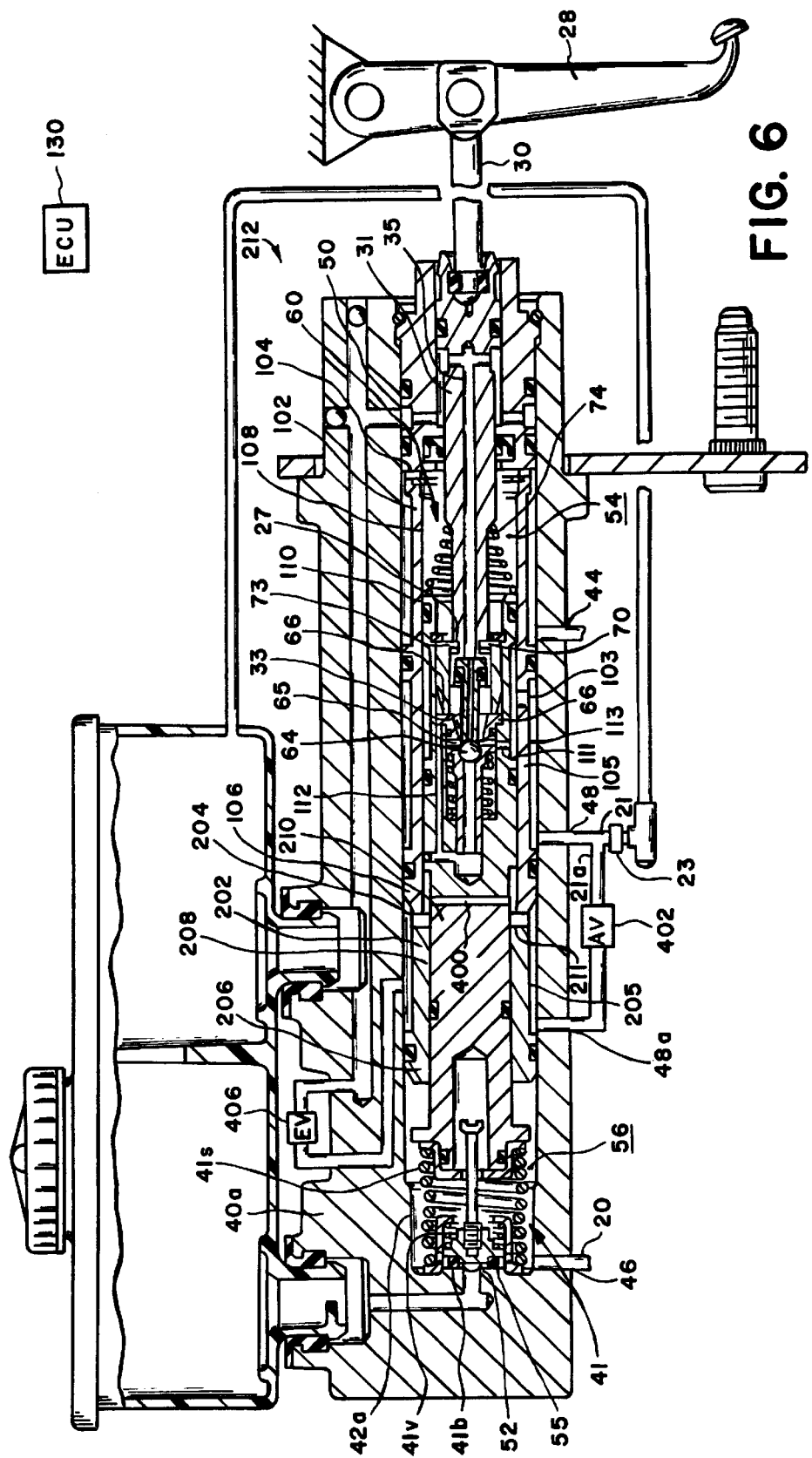
FIG. 6 is a sectional view of the master cylinder of FIG. 4 in a manual mode of operation.
Figure 7:
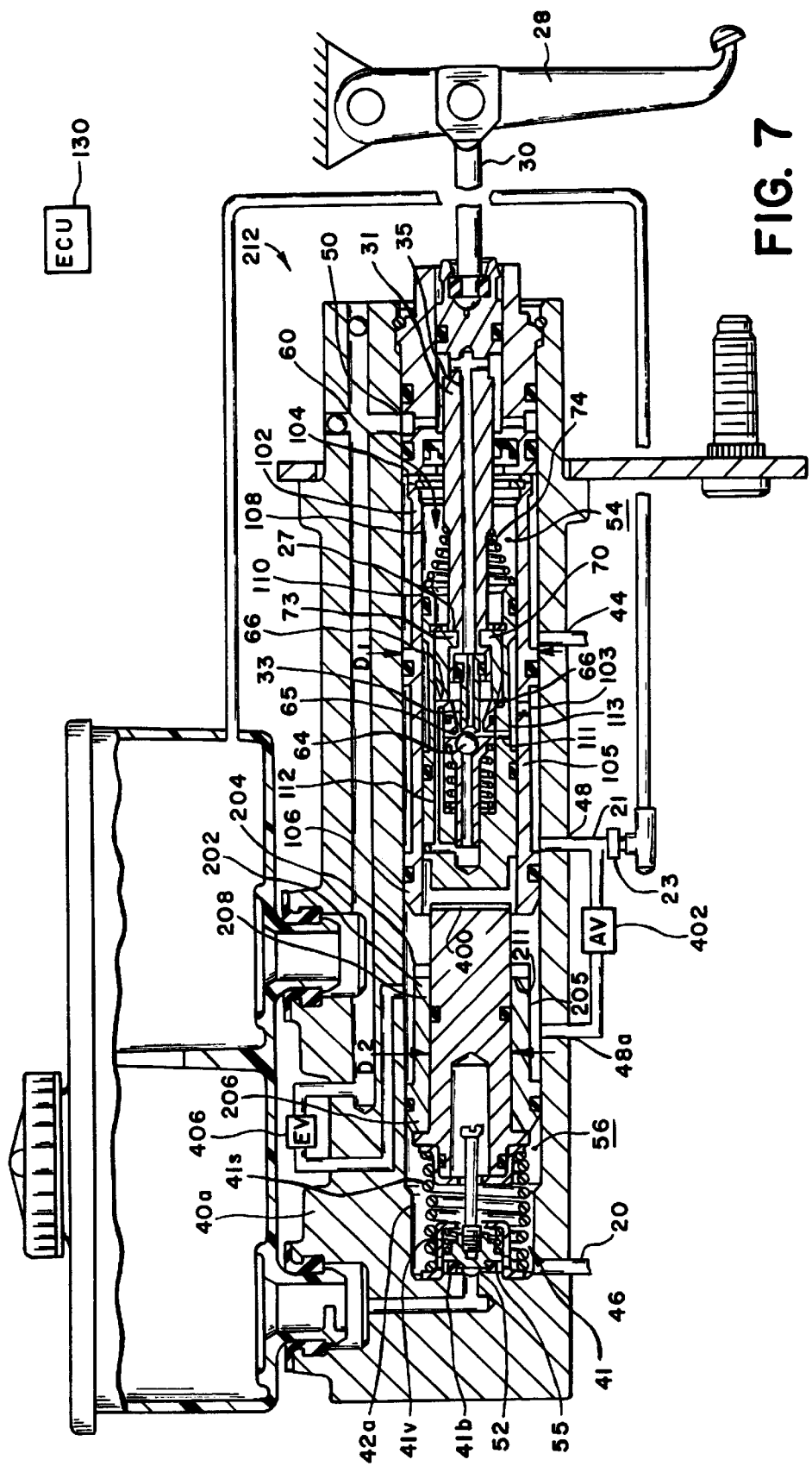
FIG. 7 is a sectional view of the master cylinder of FIG. 4 in a mode of actuation defined to by an electronic control unit (ECU) to overcome a sensed condition that may impact a safe operation of a vehicle.

If sufficient operational hydraulic fluid is not available in the accumulator 22 to provide a power assist in the pressurizing of fluid in master cylinder 212 such as may occur after a number of brake applications' when the engine is not running or when electrical energy is non-existent for some reason (a dead battery), a manual input can be applied to master cylinder 212 to achieved a brake application. Under these conditions, an input force applied to brake pedal 28 is translated into liner movement of input rod 30 that moves stem 31 and brings shoulder 27 into engagement with flange 73 on guide 70 to directly transmit a force into cylindrical body 110 by way of seat member 66. The input force that is transmitted into the cylindrical body 110, after overcoming return spring 41s, moves the first cylindrical body 110 and second cylindrical body 210 with its second effective area, corresponding to $D_2$, into chamber 56 to allow spring 41v to move seal 41b into engagement seat 55 and close compensation port 52. Further movement of the second cylindrical body 210 into chamber 56 by the input force pressurizes fluid therein that is supplied to the wheel brakes 18,18' in the second circuit to effect a brake application. The input force as transmitted through stem 31 causes cylindrical body 110 to slides in axial bore 108 and the second cylindrical body 210 to slides in axial bore 208 while sleeves 102 and 202 remain in a substantially stationary position within bore 42a as illustrated in FIG. 6. Thus, the resulting development of the pressurized fluid in the second chamber 56 during a manual mode is solely achieved through axial movement of the cylindrical body 210 into chamber 56. In this embodiment of master cylinder 212 the ratio of $D_1$ to $D_2$ is about 2:1 in order to achieve a same level of pressurized fluid in the second chamber 56 during a manual mode of operation as achieved by a hydraulic boost through the operational pressurized fluid in accumulator 22. In the manual mode, the axial movement of the cylindrical body 210 into chamber 56 is about twice the distance it travels during the hydraulic boost mode. The ratio of $D_1$ to $D_2$ in the present embodiment of master cylinder 212, has been selected as being approximately 2:1, however it is possible that some applications may requires a different ratio. With this master cylinder design, this requirement can be easily achieve by changing the diameter of the second cylindrical body 210 to accommodate a different pressure level with a same movement of the input member 30. However, a ratio of about 2:1 has been found to be effective in producing sufficient pressurized fluid to effect a brake application in conformance with current standards. The ability to manually effect a brake application of brake system 210 is important, as it would permit movement of a disabled vehicle from one location to another location without compromising safety.

The brake system 210 while normally functioning in a manner similar to brake system 10 provides an added feature of independent braking when conditions as analyzed by ECU 130 indicate continued operation of a vehicle may be unsafe or pose a situation that may compromise safety of the operation of the vehicle. This braking mode is initiated by the ECU 130 to attenuate the condition that may effect the safe operation of the vehicle and is based on up to date data that is supplied to the ECU 130 by sensors such as speed, road conditions, wind conditions, sway, etc. When the ECU 130 determines a potentially dangerous situation exists, the ECU provides an actuation signal to initiate a brake application in the following manner. Actuation signals are simultaneously communicated to solenoid valves 402 and 404 to close communication of actuation chamber 400 with the reservoir 51 and to open communication to accumulator 22 through conduit 21a. Hydraulic operational fluid on being presented to actuation chamber 400 acts on the effective area $D_1$ defined by combined surface area of sleeve 202 and the second cylindrical body 210 in chamber 400 and after overcoming the caged spring and center port arrangement 41 allows spring 41v to move seal 41b into engagement with seat 55 and close chamber 56. Further movement of sleeve 202 and its second cylindrical body 210 toward the second chamber 56 pressurizes fluid therein that is supplied to the wheel brakes 18,18' in the second circuit to effect a brake application in accordance with signals supplied by the ECU to control the build 15 and decay 17 valves. At the same time, the hydraulic operational fluid presented to actuation chamber 400 also acts on the effective area $D_1$ defined by the surface area of sleeve 102 and cylindrical body 100 in chamber 400. Since end 104 of sleeve 102 bears on end cap or stop 14 it remains stationary and as a result the fluid pressure of the operational hydraulic fluid only acts on the first cylindrical body 110 to produce a force. This force, after overcoming return spring 74, moves the first cylindrical body 110 in axial bore 108 toward chamber 54. Initial movement of the first cylindrical body 100 brings ball 64 of valve 60 into engagement with end 33 of stem 31 to close communication from chamber 54 to compensation port 52 through passage 35. Further movement of cylindrical body 110 toward chamber 54 moves orifice 65 on seat member 66 away from ball 64 to open inlet port 44 to chamber 54. In this situation, ball 64 is held stationary by stem 31 and as a result operational hydraulic fluid is freely communicated from accumulator 22 to chamber 54 and correspondingly directly communicated to the wheel brakes 14,14' in the first circuit to effect a brake application in accordance with signals supplied by the ECU 130 to the build 15 and decay 17 valves associated with a wheel brake. Once the ECU 130 determines from data supplied to the sensors that the condition has been attenuated to a level where a safe operation of the vehicle has been established, the signals to the solenoid valves 402 and 404 are terminated and these valves resume their off condition where actuation chamber 400 is communicated to reservoir 51 and isolated from accumulator 22.

We claim:

1. A master cylinder including:
   a housing with a bore therein, said bore having a first outlet port connected to wheel brakes in a first brake circuit, a second outlet port connected to wheel brakes in a second brake circuit, and an inlet port connected to a source of operational hydraulic fluid;
   piston means located in said bore for defining a first chamber that is connected to said first outlet port and a second chamber that is connected to said second outlet port;
   first valve means carried by said piston means and connected to control communication of operational hydraulic fluid available at said inlet port;
   an input member connected to a pedal and to said first valve means, said input member being axially moved by an input force applied to said pedal to operate said first valve means and utilize said operational hydraulic fluid in the development of pressurized fluid that is communicated to said wheel brakes in said first brake circuit and said wheel brakes in said second circuit to effect a first brake application, said piston means being characterized by:
   a first surface area and a smaller second surface area that are combined to define a first effective area while said second surface area defines a second effective area that are located in said first chamber, said first valve means on being moved by said input member allowing operational pressurized fluid to be communicated to said first chamber, said pressurized fluid being directly communicated to said wheel brakes in said first brake circuit to initiate a brake application and acting on said first effective area to move said piston means toward said second chamber to pressurize fluid therein that is communicated to said wheel brakes in said second circuit to effect a first brake application and wherein in an absence of the presence of said operational hydraulic fluid in said first chamber a manual input force moves said second effective area into said second chamber to pressurize fluid therein to develop a second pressurize fluid that is communicated to said wheel brakes in said second brake circuit to effect a second brake application.

2. The master cylinder as recited in claim 1 wherein said piston means is further characterized by:
   a first cylindrical body located in said bore, said first cylindrical body having a first end and a second end with an axial bore that extends from said first end to said second end; and
   a second cylindrical body that is concentrically located In said axial bore of said first cylindrical body, said second cylindrical body having a first end and a second end with a blind bore that extends from said first end toward said second end, said first cylindrical body and second cylindrical body having a combined surface area that defines said first effective area while said second cylindrical body has a second surface area that defines said second effective area.

3. The master cylinder as recited in claim 2 wherein said second cylindrical body is characterized in that said blind bore receives and aligns said first valve means with said input member.

4. The master cylinder as recited in claim 3 wherein said piston means movement is characterized in that the distance required by said operational hydraulic fluid acting on said first effective area to develop said first pressurized fluid is about one-half the distance required by a manual force acting on said second effective area to develop said second pressurized fluid wherein said first and second pressurized fluids have substantially equal pressure levels.

5. The master cylinder as recited in claim 3 wherein said piston means movement is characterized by the distance said first effective area is moved by said operational hydraulic fluid to develop said first pressurized fluid and the distance the second effective area is moved into the second chamber by the manual force to develop a second pressurized fluid is proportional to a ratio of the diameter of said first cylindrical body to the diameter of said second cylindrical body.

6. The master cylinder as recited in claim 5 wherein said ratio is characterized by such that to produce substantially equal pressure levels for said first and second pressurized fluids the distance is about 2:1.

7. The master cylinder as recited in claim 1 wherein said piston means is further characterized by:
   a first sleeve located in said bore and having a first end and a second end; and
   a first cylindrical body concentrically located in said first sleeve, said first cylindrical body having a first end and a second end with a blind bore that extends from said first end toward said second end, said first sleeve having a first surface area and said first cylindrical body having a second surface area, said first surface area and said second surface area being combined to define said first effective area while said second surface area defines said second effective area.

8. The master cylinder as recited in claim 1 wherein said piston means is further characterized by:
   a first sleeve located in said bore and having a first end and a second end;
   a first cylindrical body concentrically located in said first sleeve, said first sleeve and first cylindrical body being located in said bore to define said first chamber,
   a second sleeve located in said bore adjacent said first sleeve; and a second cylindrical body concentrically located in said second sleeve, said second sleeve and second cylindrical body being located in said bore to define said second chamber, said first sleeve having a first surface area and said first cylindrical member having a second surface area, said first and second surface areas being combined to defines said first effective area while said second surface area defines said second effective area, said operational hydraulic fluid acting on said first effective area to move said piston means toward said second chamber to pressurize fluid therein in response to operational hydraulic fluid being present in said first chamber and a manual input force being applied to said input member to move said first and second cylindrical bodies toward said second chamber in an absence of operational hydraulic fluid in said first chamber to pressurize fluid in said second chamber to develop said second pressurized fluid.

9. The master cylinder as recited in claim 8 wherein said piston means is further characterized by:

an actuation chamber located between said first sleeve and said first cylindrical body and said second sleeve and said second cylindrical body, said actuation chamber being connected to said source of pressurized operational fluid through a second input port in said housing; and second valve means responsive to an ECU for allowing said source of pressurized operational hydraulic fluid to be communicated to said actuation chamber, said pressurized operational fluid moving said first cylindrical body toward said first chamber to actuate said first valve means and allow said operational hydraulic fluid to be communicated to said wheel brakes in said first circuit by way of said first chamber and moving said second sleeve and second cylindrical body toward said second chamber to pressurize fluid therein and develop a third pressurized fluid that is supplied to said wheel brakes in said second circuit.

10. The master cylinder as recited in claim 9 further characterized by a caged return spring located in said second chamber that acts on said second cylindrical body to located said piston means in a position of rest where communication of operational hydraulic fluid through said first valve means is interrupted such that said first chamber is connected to a reservoir.

* * * * *